(12) United States Patent
Norris

(10) Patent No.: US 9,109,418 B1
(45) Date of Patent: *Aug. 18, 2015

(54) METHOD AND APPARATUS FOR IMPROVING THE INTEGRITY OF A PIPELINE

(71) Applicant: AIR LIQUIDE LARGE INDUSTRIES U.S. LP, Houston, TX (US)

(72) Inventor: Dennis Norris, Houston, TX (US)

(73) Assignee: Air Liquide Large Industries U.S. LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/464,048

(22) Filed: Aug. 20, 2014

Related U.S. Application Data

(63) Continuation of application No. 14/270,451, filed on May 6, 2014.

(51) Int. Cl.
*B01D 53/04* (2006.01)
*E21B 37/00* (2006.01)
*B01D 46/00* (2006.01)
*B01D 53/26* (2006.01)
*B65G 5/00* (2006.01)

(52) U.S. Cl.
CPC .............. *E21B 37/00* (2013.01); *B01D 46/00* (2013.01); *B01D 53/04* (2013.01); *B01D 53/261* (2013.01); *B01D 2256/00* (2013.01); *B01D 2256/16* (2013.01); *B01D 2257/80* (2013.01); *B01D 2259/402* (2013.01); *B01D 2259/4525* (2013.01); *B65G 5/00* (2013.01)

(58) Field of Classification Search
CPC .. B01D 53/04; B01D 53/261; B01D 2256/00; B01D 2256/16; B01D 2257/80; B01D 2259/402; B01D 2259/4525; B01D 46/00; B65G 5/00; F17C 3/005; F17C 1/005; Y02C 10/14
USPC ............ 95/28, 117, 273; 96/1–3, 121; 405/53
See application file for complete search history.

(56) References Cited

U.S. PATENT DOCUMENTS

| | | | | |
|---|---|---|---|---|
| 2,878,165 A | * | 3/1959 | Cottle | 203/99 |
| 3,438,203 A | * | 4/1969 | Lamb et al. | 405/59 |
| 3,807,181 A | * | 4/1974 | Kuhne | 405/59 |
| 4,377,397 A | * | 3/1983 | Clements | 95/286 |
| 4,592,677 A | * | 6/1986 | Washer | 405/59 |
| 6,579,454 B2 | * | 6/2003 | Kaske | 210/222 |
| 7,078,011 B2 | * | 7/2006 | Morrow et al. | 423/648.1 |
| 8,002,498 B2 | * | 8/2011 | Leone et al. | 405/53 |
| 8,757,926 B2 | * | 6/2014 | Drnevich | 405/53 |
| 2011/0100213 A1 | * | 5/2011 | Finkenrath et al. | 95/92 |

* cited by examiner

*Primary Examiner* — Frank Lawrence
(74) *Attorney, Agent, or Firm* — Justin K. Murray

(57) ABSTRACT

A method and apparatus is provided which will improve the integrity of a pipeline by removing moisture and solid particulates that have been entrapped within a gas originating from an underground storage cavern following pressure reduction before introducing the gas into the pipeline.

18 Claims, 1 Drawing Sheet

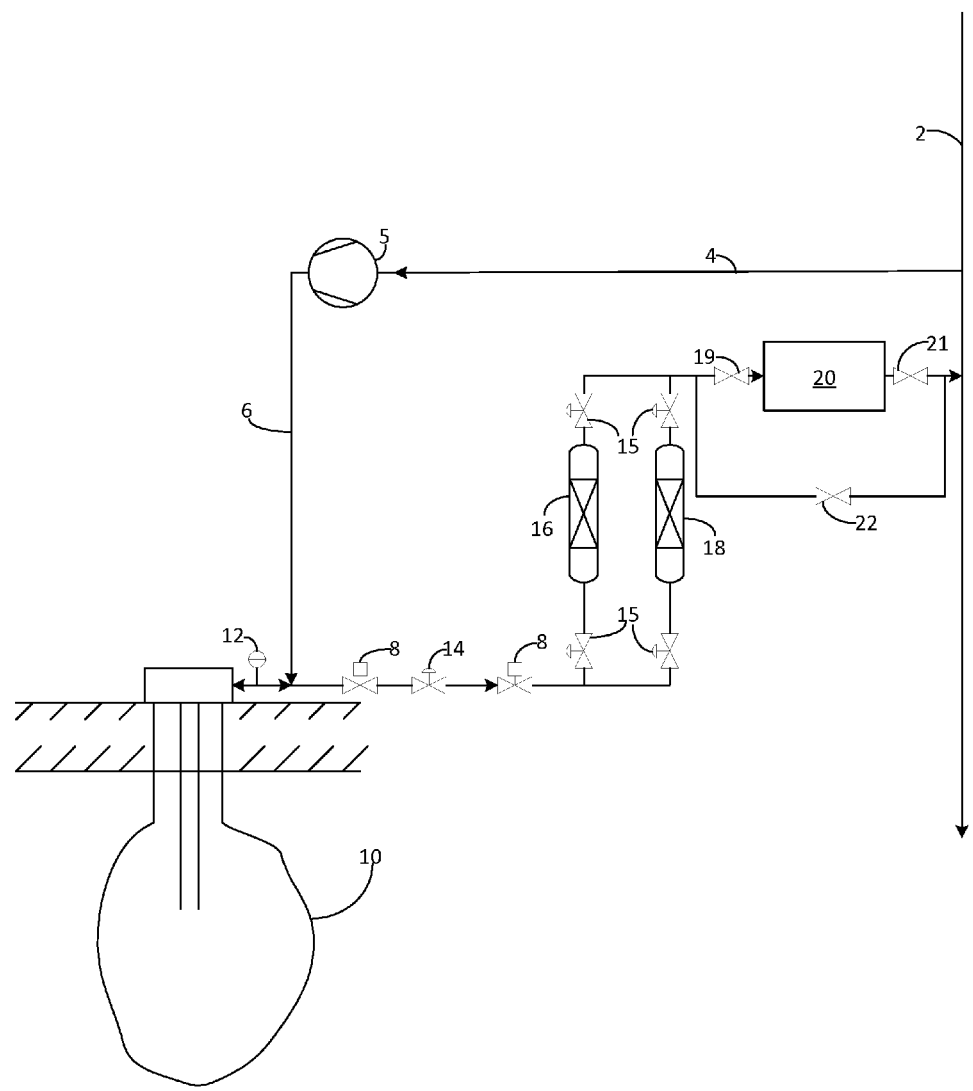

METHOD AND APPARATUS FOR IMPROVING THE INTEGRITY OF A PIPELINE

CROSS-REFERENCE TO RELATED APPLICATION

This patent application is a continuation of U.S. application Ser. No. 14/270,451, filed May 6, 2014, the entire contents of which are incorporated herein by reference.

TECHNICAL FIELD OF THE INVENTION

The present invention relates to a method and apparatus for improving the operating integrity of a pipeline that receives a pressurized gas originating from an underground storage cavern.

BACKGROUND OF THE INVENTION

It is known to store hydrogen, as well as other gases in salt caverns. These large storage sites help to provide a buffer in the event when customer demand exceeds normal production capacity or if production capacity is reduced below normal levels.

SUMMARY OF THE INVENTION

Certain embodiments of the present invention relate to a method and apparatus for improving the operating integrity of a pipeline that receives a pressurized gas originating from an underground storage cavern.

In one embodiment, the method can include the steps of removing the pressurized gas from the underground storage cavern, reducing the pressure of the pressurized gas, removing water from the pressurized gas, removing solid particles suspended in the pressurized gas to form a clean gas, and introducing the clean gas to the pipeline. By removing both water and suspended solid particles from the pressurized gas prior to introduction to the pipeline, the integrity of the pipeline is maintained.

According to other optional aspects of the invention:
the pressurized gas is at or above 10 atmospheres, preferably 50 atmospheres, and more preferably 150 atmospheres, and above the pressure of the pipeline when removing the pressurized gas from the underground storage cavern;
the pressurized gas is at a sufficiently high pressure within the underground storage cavern such that the method comprises an absence of an additional pressurization step between removing the pressurized gas from the underground storage cavern and introducing the clean gas to the pipeline;
the step of removing the pressurized gas from the underground storage cavern is conducted in the absence of a mechanical device;
the purity of the pressurized gas is substantially the same as the purity of the clean gas, except for the removal of moisture and solid particles;
the method comprises an absence of a step of removing $CO_2$, methane and/or hydrogen sulfide from the pressurized gas;
the pressurized gas is selected from the group consisting of nitrogen, natural gas, air, carbon dioxide, hydrogen, helium, argon, and combinations thereof;
the particle removal system comprises a mechanical filtration system having a filter housing, wherein the mechanical filtration system is configured to allow for isolation of the filter housing;
the method further includes the step of isolating the filter housing and replacing an existing filter within the filter housing with a new filter;
the particle removal system comprises a magnetic separation system configured to remove fine dust particles based on magnetic properties;
the drier includes a desiccant; and
the method further includes the step of measuring the pressure drop of the pressurized gas following the step of reducing the pressure of the pressurized gas.

In another embodiment of the invention, the apparatus can include a pressure reducing device in fluid communication with the underground storage cavern, a water removing device in fluid communication with an outlet of the pressure reducing device, and a particle removal device in fluid communication with an outlet of the water removing device. In one embodiment, the pressure reducing device is configured to reduce the pressure of the pressurized gas received from the underground storage cavern. In another embodiment, the water removing device is configured to remove water from the pressurized gas received from the outlet of the pressure reducing device. In another embodiment, the particle removal device is configured to remove solid particles suspended in the pressurized gas received from the outlet of the water removing device to form a clean gas, wherein the particle removal device has an outlet in fluid communication with the pipeline such that the particle removal device is configured to introduce the clean gas to the pipeline.

According to other optional aspects of the invention:
the water removing device includes a pair of desiccant driers configured in a permutable fashion such that one of the driers can be in operation while the other dryer is being regenerated;
the particle removal device includes a mechanical filtration system having a filter housing, wherein the mechanical filtration system is configured to allow for isolation of the filter housing;
the pressurized gas is at or above 10 atmospheres, preferably 50 atmospheres, and more preferably 150 atmospheres, and above the pressure of the pipeline at a point upstream of the pressure reducing device;
the apparatus further includes an absence of a mechanical device between the pressure reducing device and the underground storage cavern;
the purity of the pressurized gas is substantially the same as the purity of the clean gas, except for the removal of water and solid particles;
the water removing device and the particle removal device do not remove a significant amount of any other impurities in the pressurized gas;
the pressurized gas is selected from the group consisting of nitrogen, natural gas, air, carbon dioxide, hydrogen, helium, argon, and combinations thereof;
the apparatus is configured such that the purity of the pressurized gas is substantially the same as the purity of the clean gas, except for the removal of water and solid particles; and
the particle removal system comprises a magnetic separation system configured to remove fine dust particles based on magnetic properties.

BRIEF DESCRIPTION OF THE DRAWINGS

These and other features, aspects, and advantages of the present invention will become better understood with regard to the following description, claims, and accompanying drawing. It is to be noted, however, that the drawing illustrates only an embodiment of the invention and is therefore not to be considered limiting of the invention's scope as it can admit to other equally effective embodiments.

The FIGURE shows a method and apparatus for improving the integrity of a pipeline in accordance with an embodiment of the present invention.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

High pressure gases, including, but not limited to: nitrogen, air, carbon dioxide, hydrogen, helium, and argon, can be stored in caverns, whether leached in salt formations or created by hard rock mining. These caverns can contain moisture and solid particles that, if suspended by the high pressure gas removed from the cavern, could cause corrosion or damage to downstream equipment and/or the pipeline when introduced to the pipeline.

For the purpose of this invention, the definition of high pressure is defined as a pressure at or above 10 atmospheres. Additionally, the term "suspended by" is meant to include any instance where a solid particle is carried by or contained in the high pressure gas, such that the solid particle is removed from the underground cavern along with the high pressure gas.

Now turning to the FIGURE. The gas is withdrawn from pipeline 2 via line 4 and compressed in compressor 5 to a pressure that is sufficiently high enough such that the gas can be removed from underground storage cavern 10 without any mechanical means (e.g., pumps, etc. . . . ), preferably to a pressure of 10 atmospheres or higher. Following compression, the gas travels via line 6. When isolation valve 8 is in a closed position, the gas is then directed into underground storage cavern 10. The flow rate of the gas going in and out of underground storage cavern can be monitored by flow indicator 12.

When it is desired to use gas from underground storage cavern 10, isolation valves 8 are opened, which allows for the gas to expand across pressure control device 14 before heading to driers 16, 18 for removal of moisture within the gas.

Each of the driers 16, 18 can be periodically regenerated by reversing the flow from the on-stream drier(s) through the off-steam drier(s) for a period of time needed to remove the moisture from the desiccant in the off-stream drier(s). This regeneration gas can be vented to a safe location (not shown). After the appropriate period of time, the off-stream drier will be ready to be placed back on-stream and can then be used for removal of moisture from the gas, and the previous on-stream drier can then be placed off-stream for regeneration. In one embodiment, driers 16, 18 can be desiccant driers. In the embodiment shown, valves 15 allow for control of the flow of the gas through driers 16, 18.

Isolation valves 8 are optional and can provide additional safety in the event pressure control device 14 fails. Should pressure control device 14 fail to safely control the pressure of the gas, isolation valves 8 can be closed in order to protect the equipment downstream pressure control device 14. In one embodiment, isolation valves 8 are closed if the pressure of the gas downstream pressure control device 14 exceeds a threshold value. In one embodiment, the threshold value is at or below the pressure rating of the driers 16, 18. In another embodiment, a pressure relief valve (not shown) can be included to provide additional safety in the event of failure of pressure control device 14 or isolation valves 8.

After drying, the gas is withdrawn from the one or more driers 16, 18 and introduced to particle removal system 20 for removal of solid particles. In one embodiment, particle removal system 20 can comprise a mechanical filtration system with means for isolating a filter housing, such that filters within the filter housing can be replaced when needed. In one embodiment, valves 19, 21 and 22 can provide the means for isolating the filter housing. In one embodiment, the mechanical filtration system can include cylindrical, pleated filters.

Following removal of solid particles, the gas is then introduced back to pipeline 2 for use. In another embodiment, particle removal system 20 can include a magnetic separation system configured to remove fine dust particles based on magnetic properties, for example, iron oxide.

In one embodiment, the pressure of the gas in the cavern is maintained above the pipeline pressure. This advantageously allows for the absence of a mechanical device other than driers 16, 18 and particle remove system 20 (e.g., no need for an additional pump to move the gas from the storage cavern to the pipeline). In another embodiment, the purity of the gas as it is removed from the storage cavern, other than the removal of the moisture and/or particles, will be substantially unaffected. In another embodiment, only moisture and solid particles are removed from the gas. In another embodiment, hydrogen sulfide or carbon dioxide are not removed from the gas before reintroducing the gas to the pipeline.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms "a", "an", and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for improving the integrity of a pipeline that receives a pressurized gas of hydrogen originating from an underground salt cavern, the method comprising the steps of:
   removing the pressurized gas from the underground salt cavern;
   reducing the pressure of the pressurized gas;
   removing moisture from the pressurized gas using a drier;
   removing solid particles suspended in the pressurized gas using a particle removal system to form a clean gas; and
   introducing the clean gas to the pipeline,
   wherein the purity of the pressurized gas is substantially the same as the purity of the clean gas, except for the removal of moisture and solid particles.

2. The method as claimed in claim 1, wherein the pressurized gas is at or above 10 atmospheres and above the pressure of the pipeline when removing the pressurized gas from the underground salt cavern.

3. The method as claimed in claim 1, wherein the pressurized gas is at a sufficiently high pressure within the underground salt cavern such that the method comprises an absence of an additional pressurization step between removing the pressurized gas from the underground salt cavern and introducing the clean gas to the pipeline.

4. The method as claimed in claim 1, wherein the step of removing the pressurized gas from the underground salt cavern is conducted in the absence of a mechanical device.

5. The method as claimed in claim 1, further comprising an absence of the step of removing $CO_2$ and/or hydrogen sulfide from the pressurized gas.

6. The method as claimed in claim 1, wherein the particle removal system comprises a mechanical filtration system having a filter housing, wherein the mechanical filtration system is configured to allow for isolation of the filter housing.

7. The method as claimed in claim 6, further comprising the step of isolating the filter housing and replacing an existing filter within the filter housing with a new filter.

8. The method as claimed in claim 1, wherein the particle removal system comprises a magnetic separation system configured to remove fine dust particles based on magnetic properties.

9. The method as claimed in claim 1, wherein the drier comprises a desiccant.

10. The method as claimed in claim 1, further comprising the step of measuring the pressure drop of the pressurized gas following the step of reducing the pressure of the pressurized gas.

11. An apparatus for improving the integrity of a pipeline that receives a pressurized gas of hydrogen originating from an underground salt cavern, the apparatus comprising:
   a pressure reducing device in fluid communication with the underground salt cavern, the pressure reducing device configured to reduce the pressure of the pressurized gas received from the underground salt cavern;
   a water removing device in fluid communication with an outlet of the pressure reducing device, the water removing device configured to remove water from the pressurized gas received from the outlet of the pressure reducing device; and
   a particle removal device in fluid communication with an outlet of the water removing device, the particle removal device configured to remove solid particles suspended in the pressurized gas received from the outlet of the water removing device to form a clean gas, wherein the particle removal device has an outlet in fluid communication with the pipeline such that the particle removal device is configured to introduce the clean gas to the pipeline,
   wherein the apparatus is configured such that the purity of the pressurized gas is substantially the same as the purity of the clean gas, except for the removal of water and solid particles.

12. The apparatus as claimed in claim 11, wherein the water removing device comprises a pair of desiccant driers configured in a permutable fashion such that one of the driers can be in operation while the other dryer is being regenerated.

13. The apparatus as claimed in claim 11, wherein the particle removal device comprises a mechanical filtration system having a filter housing, wherein the mechanical filtration system is configured to allow for isolation of the filter housing.

14. The apparatus as claimed in claim 11, wherein the pressurized gas is at or above 10 atmospheres and above the pressure of the pipeline at a point upstream of the pressure reducing device.

15. The apparatus as claimed in claim 11 farther comprising an absence of a mechanical device between the pressure reducing device and the underground salt cavern.

16. The apparatus as claimed in claim 11, wherein the purity of the pressurized gas is substantially the same as the purity of the clean gas, except for the removal of water and solid particles.

17. The apparatus as claimed in claim 11, wherein the water removing device and the particle removal device do not remove a significant amount of any other impurities in the pressurized gas.

18. The apparatus as claimed in claim 11, wherein the particle removal system comprises a magnetic separation system configured to remove fine dust particles based on magnetic properties.

* * * * *